No. 739,192. PATENTED SEPT. 15, 1903.
R. LOVE.
WAGON BRAKE.
APPLICATION FILED FEB. 7, 1902.
NO MODEL. 2 SHEETS—SHEET 2.

Witnesses
Inventor
Robert Love
by
Attorneys

No. 739,192.        Patented September 15, 1903.

UNITED STATES PATENT OFFICE.

ROBERT LOVE, OF TUNNELTON, PENNSYLVANIA.

WAGON-BRAKE.

SPECIFICATION forming part of Letters Patent No. 739,192, dated September 15, 1903.

Application filed February 7, 1902. Serial No. 92,966. (No model.)

*To all whom it may concern:*

Be it known that I, ROBERT LOVE, a citizen of the United States, residing at Tunnelton, in the county of Indiana and State of Pennsylvania, have invented certain new and useful Improvements in Wagon-Brakes, of which the following is a specification.

My invention relates to wagon-brakes of that type in which the brake-bar is carried by eccentrically-pivoted links and the bar engages with the peripheries of the wheels below a horizontal plane extending through the axes thereof, whereby the forward rotation of the wheels when the brake-bar is in contact therewith will serve to increase the grip of said bar.

The invention resides in the details of construction, as will be hereinafter described, and particularly pointed out in the claims.

The invention is illustrated in the accompanying drawings, in which—

Figure 1:
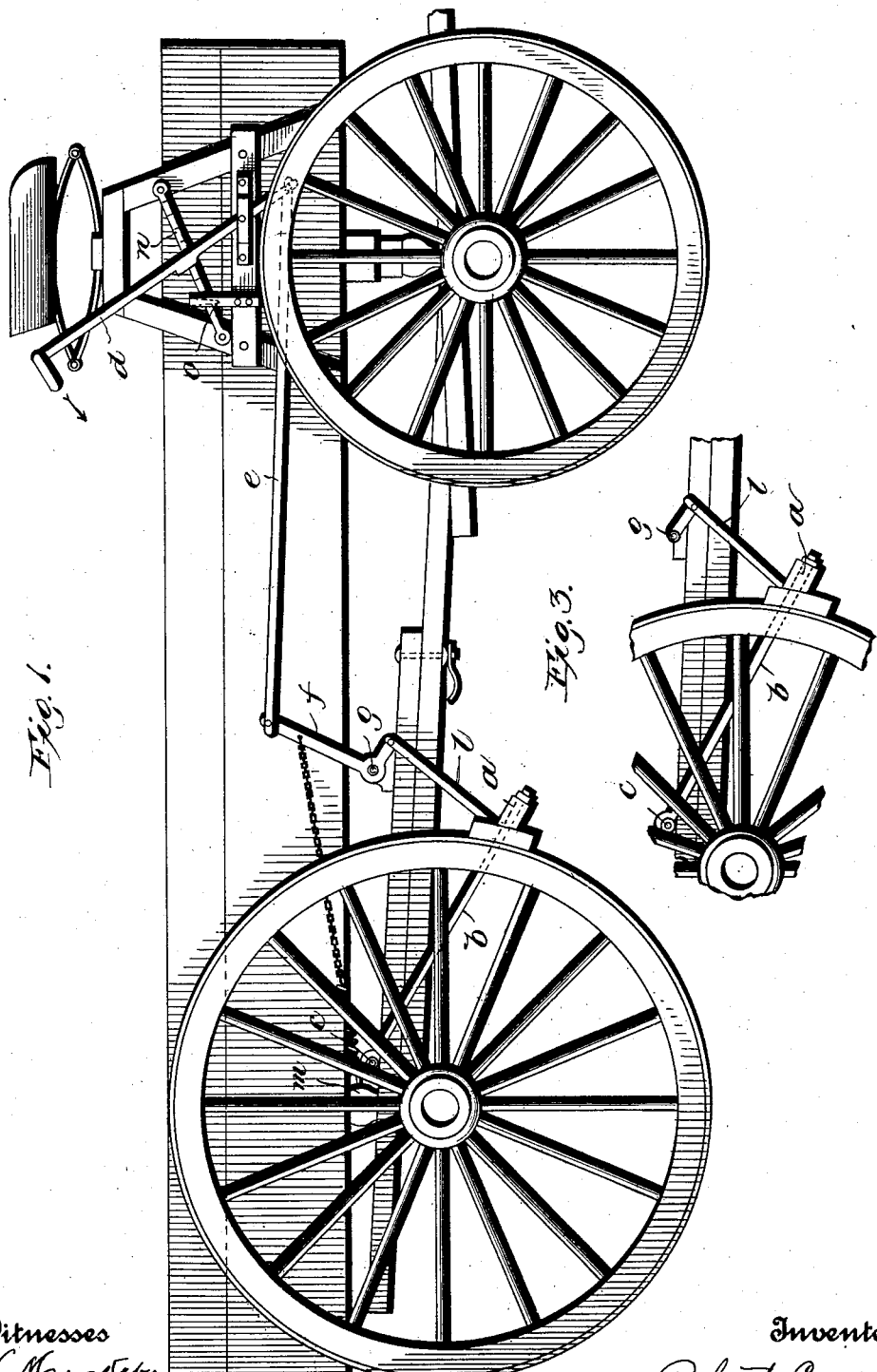
Figure 2:
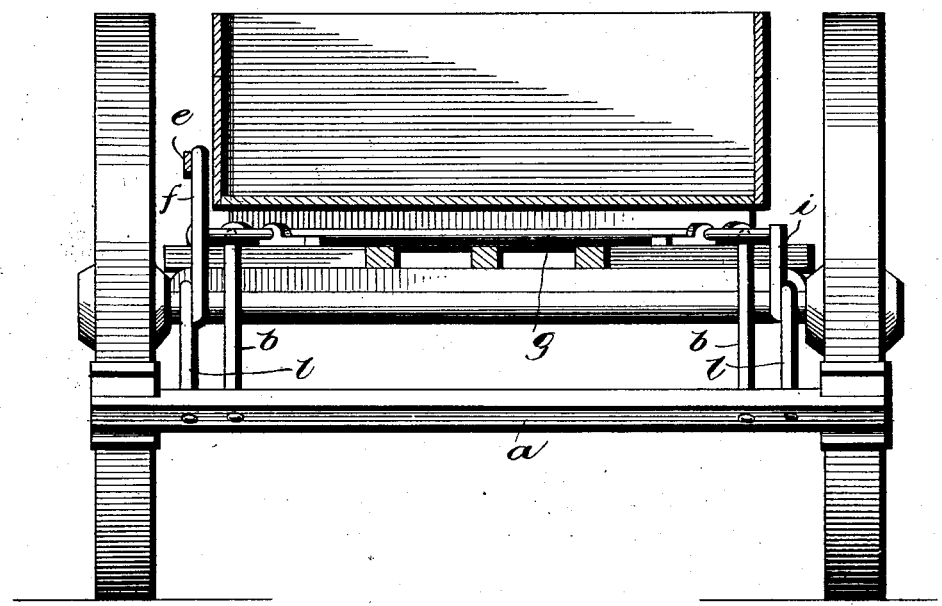
Figure 4:
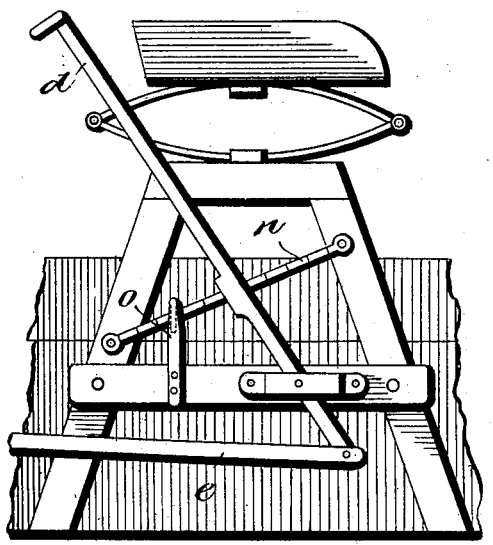
Figure 5:
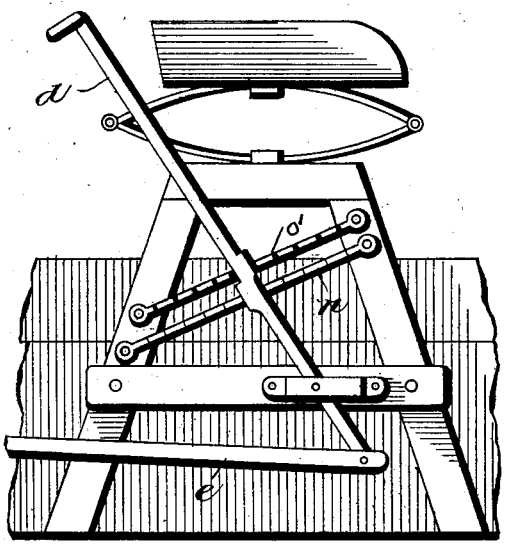

Figure 1 shows the invention in side elevation applied to an ordinary road-wagon. Fig. 2 is a transverse sectional view. Fig. 3 is a detail view, in side elevation, illustrating the mechanism arranged at the opposite side of the wagon to that shown in Fig. 1. Fig. 4 is a detail view of the mechanism coacting with the hand-lever for arresting the movement thereof and for locking said lever, and Fig. 5 illustrates a modification of this mechanism.

In the accompanying drawings I have shown my improved brake mechanism applied to an ordinary road-wagon, and it will be understood that with but slight modifications, well within the scope of the invention, it may be applied to a variety of wagons.

The brake-bar is shown at $a$ being carried by links $b$, extending through each end thereof and pivoted to the opposite ends of a cross-bar $c$, supported upon and secured to the running-gear of the wagon.

As will be noted, the links are pivoted above and eccentrically of the axes of the wheels, while the brake-bar engages the periphery of the latter below a horizontal plane through said axes. It will thus be appreciated that the brake-bar will be carried around by the wheels when in frictional contact therewith and that as this movement of the bar increases the distance between the same and the pivotal point of the supporting-links said bar will be drawn more tightly against the wheels to increase the braking action as the wheel rotates.

The movement of the brake-bar is controlled by a hand-lever $d$, pivoted to a suitable bracket arranged beneath the driver's seat or, rather, to the side of the wagon below the end of the driver's seat. This lever is provided with a handle portion extending up to within easy reach of the driver and a portion or extension below its pivot, which is pivotally connected by a horizontally-extending link $e$ to the vertical member of a bell-crank lever $f$, pivoted to or on a bracket secured to the wagon running-gear. This bell-crank lever is preferably mounted on the end of a transverse shaft $g$, pivotally supported in brackets mounted on said gear, and said shaft carries at its end opposite to that on which the bell-crank lever is mounted a lever or arm $i$, corresponding to the short arm of said bell-crank lever. The short arm of this lever is pivotally connected at its ends by a link $l$ to one end of the brake-bar, and a corresponding link connects the other end of said bar to the end of the lever or arm $i$. The brake-bar is thus supported from the shaft $g$, which may be termed a "rock-shaft," and the position of the latter is controlled directly by the vertical member of the bell-crank lever. To normally hold this member retracted, whereby the brake-bar is maintained out of frictional engagement with the wheels, and to assist in releasing said bar, as will be hereinafter explained, and also to steady the movement of the braking mechanism, a yielding connection is interposed between the upper part of said arm and a fixed point or lug arranged to the rear of said bell-crank. As shown herein, this yielding connection comprises an adjustable chain, connected at one end directly to the vertical member of the bell-crank, and a coil-spring interposed between the opposite end of the same and a fixed part $m$ on the wagon-body. The tensioning of this spring is such that it tends normally to retract the bell-crank. The movement of the bell-crank is controlled by the hand-lever, before described, and to throw the brake-bar into frictional contact with the wheels this lever is thrown in the direction of the arrow. As before described, as soon as the brake-bar engages the periphery of the wheels it will be carried around by the same and in said movement tightened thereupon. To limit or arrest the movement of the brake-bar under the influence of the wheels, I have provided a fixed ratchet-bar $n$, with which a catch on the hand-lever is adapted to engage. When said catch engages a predetermined tooth on said ratchet-bar, the movement of the brake-bar beyond a predetermined point will be prevented, as in order for the brake-bar to move downwardly the forward or lower end of the hand-lever must move forwardly, and when said lever is locked this movement is of course prevented. To maintain the brake-bar in braking position when the wagon is on an incline and the wheels tend to rotate rearwardly, I provide means for locking the hand-lever against movement in an opposite direction to which it is locked by the ratchet-lever. As will be understood, if the wheels tend to rotate rearwardly and the brake-bar is free it would be raised out of frictional contact with said wheels, and consequently means must be provided to prevent this lifting action. For this purpose I have provided means to prevent the upper end of the hand-lever moving forwardly, as this action is necessary in order for the brake-bar to rise. The means shown in Fig. 1 consists merely of a catch $o$, designed to engage the hand-lever, while in the modification I have shown a ratchet-bar $o'$ arranged parallel to but with its teeth set in an opposite direction to the ratchet-bar $n$. As will be apparent, by throwing the hand-lever forwardly the bell-crank lever is rocked rearwardly and the brake-bar lifted out of engagement with the wheels, while when the hand-lever is thrown rearwardly the brake-bar is pressed into engagement with the wheels. The latter movement takes place against the tension of the spring and chain before described, and thus the mechanism is given an even and uniform action.

Having thus described the invention, what I claim as new, and desire to secure by Letters Patent, is—

1. In a wagon-brake, the combination of the running-gear, a rock-shaft mounted thereon, a bell-crank lever mounted on said rock-shaft, a brake-bar for engaging the wheel, a pair of links rigidly secured at one end to the brake-bar and pivoted at their opposite ends to supports on the frame independent of the rear axle, a hand-lever, link connections between said hand-lever and one arm of said bell-crank lever, link connections between said brake-bar and the other arm of said bell-crank lever, and a flexible connection including a tension-spring between the longer arm of the bell-crank lever having a fixed point located in rear of said brake-bar and tending to move the brake-shoes from contact with the wheels.

2. In a wagon-brake, a pivoted hand-lever, a pair of oppositely-disposed lugs or projections integral with said hand-lever and arranged one above the other, a pair of toothed racks disposed one above the other, the teeth of which are oppositely arranged for engagement by said lugs, whereby said hand-lever can be positively secured in a position corresponding to any degree of application or release of the brakes.

3. In a wagon-brake, an A-shaped frame, a hand-lever pivoted to the cross-piece of the A-shaped frame, a pair of oppositely-disposed lugs or projections integral with said hand-lever, and arranged in different horizontal planes, a pair of toothed racks the teeth of which are oppositely arranged and adapted to be engaged by said lugs, whereby said hand-lever can be positively secured in a position corresponding to any degree of application or release of the brakes.

In testimony whereof I affix my signature in presence of two witnesses.

ROBERT LOVE.

Witnesses:
T. D. BOONE,
J. C. MOORE.